UNITED STATES PATENT OFFICE.

JOHN CARNRICK, OF CRESSKILL, NEW JERSEY.

MALT EXTRACT.

SPECIFICATION forming part of Reissued Letters Patent No. 9,075, dated February 17, 1880.

Original No. 210,496, dated December 3, 1878. Application for Reissue filed January 7, 1880.

*To all whom it may concern:*

Be it known that I, JOHN CARNRICK, of Cresskill, in the county of Bergen and State of New Jersey, have invented certain Improvements in Medicinal Malt Extracts, of which the following is a specification.

This invention relates to a new malt extract which, from its composition and the peculiarities of its manufacture, possesses from three to five times the value of any preparation of the same class hitherto produced.

In carrying my said invention into practice I take separately a suitable quantity each of barley, wheat, and oats, and subject them separately to the malting process, and extract from each the malt solution in the manner usual in the production of common malt extract from barley, with these peculiar and important differences—namely, that the water used should not be above 120° Fahrenheit, and that in the concentration of the extracts to a viscid or sirupy consistence the heat is never carried as high as is the ordinary practice, but is effected *in vacuo* at a temperature ranging from 100° to 120° Fahrenheit. Concentration at this comparatively low temperature preserves intact in the solutions the phosphates, albumenoids, gluten, and diastase, which constitute the most valuable constituents of a malt extract, and which, in the usual method of preparing such extracts—viz., by concentration at a high temperature—are dissipated or decomposed, and consequently lost.

Having provided a concentrated extract from barley, from wheat, and from oats, as just described, I mingle the three in equal proportions, thereby producing, as a new medicinal agent and article of manufacture and sale, a combined extract of barley, wheat, and oats. Now it is to be expressly understood that each of the three cereals mentioned possesses some one or more valuable constituents in a greater quantity or proportion than either of the others. For example, the barley excels in diastase and the wheat in phosphates and gluten, so that, combined as herein set forth, all the desired constituents are provided in due quantity and proportions; and inasmuch as by the method of concentration at a low temperature, as herein-before fully set forth, all the valuable constituents of the several varieties are preserved, the combined extract embraces the virtues of all, and as a matter of fact has from three to five times the virtue of any malt extract hitherto made.

What I claim as my invention is—

The herein-described compound extract of malt, composed of the concentrated extracts of barley, wheat, and oats, containing their natural proportions of uncoagulated albumen and diastase, substantially as herein set forth.

JOHN CARNRICK.

Witnesses:

CHAS. H. DOXAT,

H. F. PARKER.